US00RE36171E

United States Patent [19]

Balling et al.

[11] E Patent Number: Re. 36,171

[45] Reissued Date of Patent: Mar. 30, 1999

[54] CATALYTIC CONVERTER FOR CONVERTING REACTANTS OF A GAS MIXTURE

[75] Inventors: Lothar Balling, Fuerth; Klaus Huettenhofer, Heroldsberg, both of Germany

[73] Assignee: Siemens Aktiengesellschaft, Munich, Germany

[21] Appl. No.: 818,316

[22] Filed: Mar. 14, 1997

Related U.S. Patent Documents

Reissue of:

[64] Patent No.: 5,397,545
Issued: Mar. 14, 1995
Appl. No.: 195,702
Filed: Feb. 14, 1994

[30] Foreign Application Priority Data

Feb. 17, 1993 [EP] European Pat. Off. ..... 93102492
Nov. 16, 1993 [EP] European Pat. Off. ..... 93118580

[51] Int. Cl.[6] ..... B01J 8/00

[52] U.S. Cl. ..... 422/171; 422/170; 422/172; 422/173; 422/198; 502/309; 502/312; 502/439

[58] Field of Search ..... 422/170–173, 422/198, 200; 423/239.1, 659, 213.7; 502/439, 309, 312, 527.19

[56] References Cited

U.S. PATENT DOCUMENTS

| | | | |
|---|---|---|---|
| 4,118,199 | 10/1978 | Volker et al. | 422/171 |
| 4,134,733 | 1/1979 | Volker et al. | 422/177 |
| 4,903,755 | 2/1990 | Michelfelder et al. | 423/239.1 |
| 5,132,103 | 7/1992 | Schoubye | 423/239.1 |

FOREIGN PATENT DOCUMENTS

| | | |
|---|---|---|
| 260614 | 3/1988 | European Pat. Off. . |
| 415145 | 3/1991 | European Pat. Off. . |
| 1438944 | 7/1964 | France . |
| 2139152 | 1/1973 | France . |
| 2325805 | 4/1977 | France . |
| 3544320 | 8/1987 | Germany . |
| 4027329 | 3/1992 | Germany . |
| 4032085 | 4/1992 | Germany . |
| 5114335 | 9/1980 | Japan . |
| 5115788 | 5/1993 | Japan . |

*Primary Examiner*—Hien Tran
*Attorney, Agent, or Firm*—Herbert L. Lerner; Laurence A. Greenberg

[57] ABSTRACT

A catalytic converter for accelerating at least one reaction between at least two reactants of a gas mixture includes a catalyst carrier, and a catalytically active substance. The catalytically active substance has a varable chemical composition which is varied along a flow direction of a gas mixture, for suppressing undesired side reactions.

17 Claims, 3 Drawing Sheets

CATALYTIC CONVERTER FOR CONVERTING REACTANTS OF A GAS MIXTURE

Matter enclosed in heavy brackets [ ] appears in the original patent but forms no part of this reissue specification; matter printed in italics indicates the additions made by reissue.

BACKGROUND OF THE INVENTION

Field of the Invention

The invention relates to a catalytic converter for accelerating at least one reaction between at least two reactants of a gas mixture, including a catalyst carrier and a catalytically active substance.

In a number of technical and industrial applications, catalytic converters that are especially adapted to the particular reaction of the reactants and to the reaction conditions are used for the catalytic conversion of reactants of a gas mixture. Examples thereof are so-called oxidation catalytic converters and $deNO_x$ catalytic converters.

Oxidation catalytic converters, having catalytic activity which is determined essentially by the content of noble metals and/or oxides of the transition metals, catalytically convert carbon monoxide and hydrocarbons, for instance, into carbon dioxide and water, in the simultaneous presence of oxygen from the air. With that type of exothermic reaction, heating of the catalyst occurs, which favors undesirable side reactions, such as the formation of nitrogen oxides. $DeNO_x$ catalytic converters, in the simultaneous presence of ammonia, catalytically convert nitrogen oxides into nitrogen and water by the process of selective catalytic reduction (SCR). Flue gases in which nitrogen oxides are present usually also contain sulfur dioxide. Therefore $deNO_x$ catalytic converters, because of the catalytically active substances contained in them, favor the undesired side reaction of the conversion of sulfur dioxide $SO_2$ to sulfur trioxide $SO_3$. The ammonium sulfates that form at the catalytic converter from ammonia and sulfur trioxide are highly hydrophilic. If the temperature drops below the dew point, the ammonium sulfates adhere and stop up all of the components downstream, which is extremely disadvantageous.

Typical $deNO_x$ catalytic converters are manufactured on the basis of titanium dioxide $TiO_2$, with one or more of the additives tungsten trioxide $WO_3$, molybdenum trioxide $MoO_3$ and vanadium pentoxide $V_2O_5$. The catalytic activity is essentially determined by the content of vanadium pentoxide $V_2O_5$ and $V_xMo_xO_{32-z}$. The aforementioned side reaction is made even stronger because, as a result of the preceding catalytic conversion, the content of ammonia and nitrogen oxides decreases in the flow direction of the flue gas in the catalytic converter. Due to the decrease of ammonia and nitrogen oxides, the catalytically active centers are increasingly used for $SO_2/SO_3$ conversion.

SUMMARY OF THE INVENTION

It is accordingly an object of the invention to provide a catalytic converter for converting reactants of a gas mixture, which overcomes the hereinafore-mentioned disadvantages of the heretofore-known devices of this general type, which is adapted to the particular catalytic reaction of the reactants of the gas mixture desired and which is especially well suited to averting undesired side reactions.

With the foregoing and other objects in view there is provided, in accordance with the invention, a catalytic converter for accelerating at least one reaction between at least two reactants of a gas mixture, comprising a catalyst carrier, and a catalytically active substance, the catalytically active substance having a variable chemical composition as seen in a flow direction of a gas mixture, for suppressing undesired side reactions.

It is therefore possible to adapt the catalytic activity of the catalytic converter, along its flow path, to the gas mixture composition, the flow rate, and the temperature. This kind of variable chemical composition can be attained with catalytic substances and associated carriers that are adapted to the various catalytic reactions.

In accordance with another feature of the invention, the macroscopic structure of the catalytic converter can be variable. The term "macroscopic structure" means the internal structure of the catalytic converter and its gas channels. The internal structure is different in honeycomb-like and plate-type catalytic converters. By suitably connecting these catalytic converter forms in line with one another along the flow path of the catalytic converter, the dwell times of the reactants in the catalytic converter can be varied purposefully, in such a way that even if a depletion of the reactants occurs as a consequence of the preceding desired reaction in the gas mixture, the undesired side reaction remains suppressed. One example of this is the disposition of honeycomb $deNO_x$ catalytic converters downstream, in terms of the flow direction of a flue gas containing nitrogen oxide and ammonia, from plate-type $deNO_x$ catalytic converters.

In accordance with a further feature of the invention, the catalytic activity of the catalytically active substance being used in the catalytic converter decreases in the flow direction of the gas mixture upon a temperature increase caused by an intended exothermic reaction of the reactants, and increases upon a temperature decrease caused by an intended endothermic reaction of the reactants. As a result, the catalytic activity per unit of surface area, to which the catalytic activity of the catalytic substance used in the catalytic converter and physical conditions, especially the temperature, contribute, remains largely unchanged, at predetermined gas mixture conditions, along the flow path in the catalytic converter. Therefore the catalytic activity per unit of surface area is sufficiently high to reinforce the desired catalytic reaction. At the same time, undesired side reactions are limited to a minimum as a result, since only a limited number of catalytically active centers is even free for catalysis of the side reactions.

In accordance with an added feature of the invention, titanium dioxide ($TiO_2$), vanadium pentoxide ($V_2O_5$), and/or $V_xMo_yO_{32-z}$, where $x+y \leqq 12$; $x, y \geqq 1$; $z \leqq 1$ and one or more the additives tungsten trioxide ($WO_3$) and molybdenum trioxide ($MoO_3$) are essentially contained in the catalytically active substance, and in the flow direction of the gas mixture, the content of vanadium pentoxide and/or $V_xMo_yO_{32-z}$ decreases upon intended use in exothermic reactions and increases upon intended use in endothermic reactions.

In accordance with an additional feature of the invention, in order to employ the invention in a catalytic converter for reducing the nitrogen oxides in flue gas, the concentration of vanadium pentoxide and/or $V_xMo_yO_{32-z}$, where $x+y \leqq 12$; $x, y \geqq 1$; $z \leqq 1$ in the catalytically active substance, which essentially contains titanium dioxide, vanadium pentoxide and/or $V_xMo_yO_{32-z}$ and one or more of the additives tungsten trioxide and molybdenum trioxide, decreases in the flow direction of the gas mixture, in this case flue gas, in accordance with a decreasing ammonia content in the gas mixture. As a result, the catalytic activity of the catalytically active centers, which in the broadest sense is the entire surface layer, decreases in the flow direction of the gas mixture. Due to the decrease in activity, the catalytically active centers continue to be occupied by ammonia for longer, and as a result, although the catalytic conversion of nitrogen oxides and ammonia is slowed down, nevertheless at the same time the thus-occupied catalytically active centers are not available for the undesired $SO_2/SO_3$ conversion.

In accordance with yet another feature of the invention, in order to provide adequately good catalytic conversion of the nitrogen oxides and adequately good suppression of the side reaction, such as the $SO_2/SO_3$ conversion, it is especially advantageous if the concentration of vanadium pentoxide and/or $V_xMo_yO_{32-z}$, as a function of the reaction-caused increase or decrease in temperature, decreases from a maximum of 10 weight % or increases to a maximum of 10 weight %, respectively, relative to the total weight of the catalytically active substance.

In accordance with yet a further feature of the invention, the catalytic activity is adjusted to decrease or increase in stages. As a result, the catalytic converter, which is often formed of a plurality of planes of catalytic material disposed in modules, can be furnished simply by changing the composition with respect to the catalytic activity in the applicable catalytic converter plane (layer). Particularly for a $deNO_x$ catalytic converter, which is typically formed from approximately 2 to 5 planes of catalytic material disposed in modules, this means that the content of vanadium pentoxide and/or $V_xMo_yO_{32-z}$ varies from one catalytic converter plane to another, or from layer to layer within a module, and in the process decreases in the flow direction of the gas mixture (flue gas). As a result, and advantageously, the only change in the entire production process for manufacturing a catalytic converter according to the invention is the addition of the catalytically active substance $V_2O_5$ and/or $V_xMo_yO_{32-z}$ to the other starting materials, which is done in various stages.

In accordance with yet an added feature of the invention, in order to suppress undesired side reactions (such as nitrogen oxide development) in a catalytic converter that, for instance, catalytically converts hydrocarbons and/or carbon monoxide into water and carbon dioxide with oxygen from the air, it is practical if platinum (Pt) and/or cooper oxide (CuO) and/or iron oxide (FeO) are provided as the catalytically active substance. Depending on the reaction-caused temperature increase or decrease, the concentration of the catalytically active substance in the flow direction of the gas mixture respectively decreases or increases. Proceeding in this way is advantageous especially in some applications in which the concentration of reactants in the gas mixture is so high that because of the reaction of the reactants the temperature of the gas mixture rises by several hundred Kelvins. For instance, in an oxidation catalytic converter, when complete conversion of the carbon monoxide into carbon dioxide takes place, 1 $Nm^3$ of flue gas, containing 1 g of carbon monoxide, is heated by approximately 8K. Each time the gas mixture is heated in the simultaneous presence of oxygen and nitrogen, the formation of undesired nitrogen oxides at the catalytically active centers of the catalytic converter is promoted.

In accordance with a concomitant feature of the invention, the concentration of the aforementioned catalytically active substance decreases from a maximum of 10 weight % or increases to a maximum of 10 weight %, relative to the total weight of the catalytically active substance.

Other features which are considered as characteristic for the invention are set forth in the appended claims.

Although the invention is illustrated and described herein as embodied in a catalytic converter for converting reactants of a gas mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
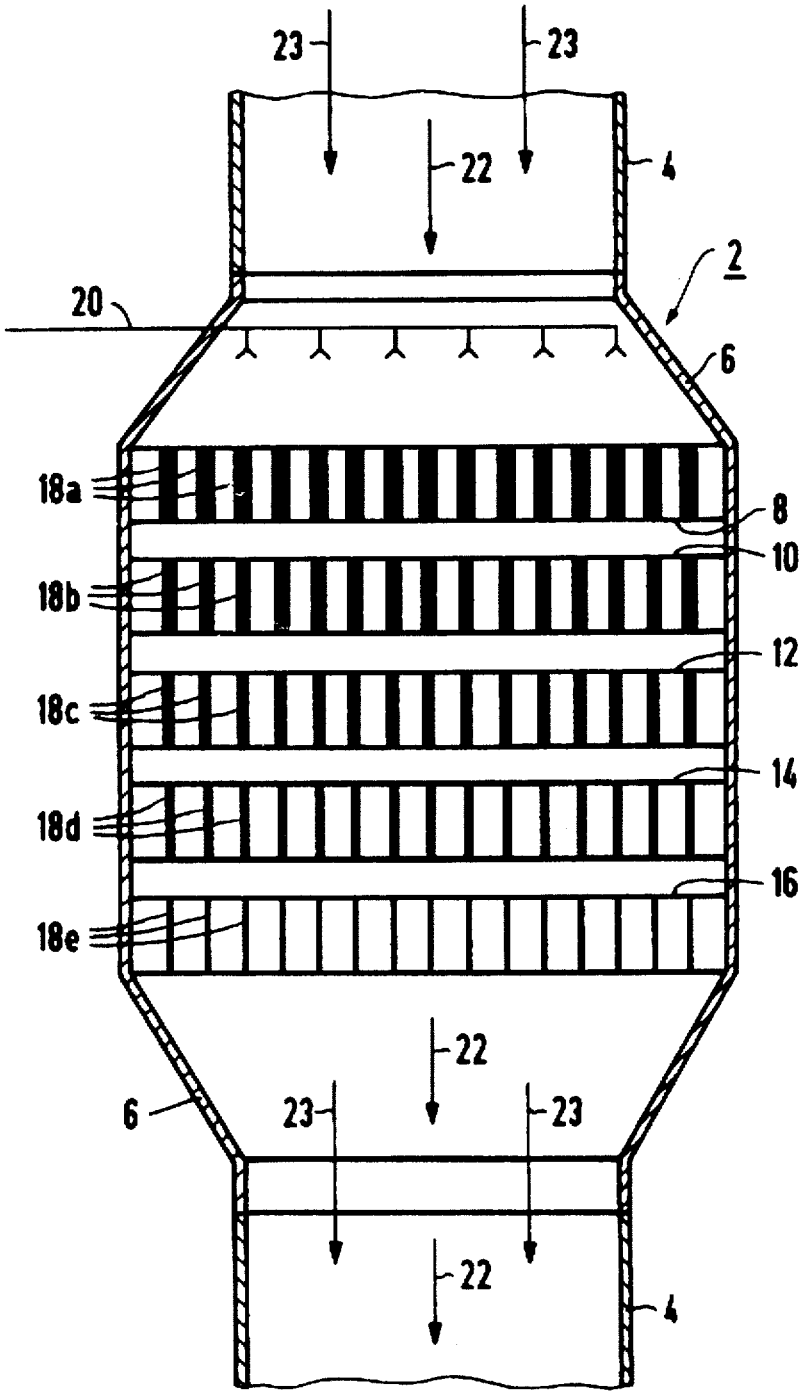
FIG. 1 is a fragmentary, diagrammatic, longitudinal-sectional view of a catalytic converter for decreasing the nitrogen oxides in the flue gas of a combustion system.

Referring now in detail to the figures of the drawing, in which identical elements have the same reference numerals, and first, particularly, to FIG. 1 thereof, there is seen a catalytic converter 2 for decreasing nitrogen oxides in a flue gas 23 ($deNO_x$ catalytic converter), which is installed in a flue gas line 4 of a combustion system. In this exemplary embodiment, coal with a relatively high sulfur content is the intended energy medium. The $deNO_x$ catalytic converter 2 includes a reactor 6, in which five layers or catalytic converter planes in the form of catalyst carriers 8, 10, 12, 14, 16 containing catalytic material 18a–18e, and an injection device 20 for ammonia, are built in. When the combustion system is in operation, the flue gas 23 flows through the $deNO_x$ catalytic converter 2 in the direction of arrows 22.

Due to the combustion of coal with a relatively high sulfur content, the flue gas 23 upon entering the $deNO_x$ catalytic converter 2 has a pollutant content of approximately 3000 $mg/Nm^3$ of sulfur dioxide and approximately 1000 $mg/Nm^3$ of nitrogen oxide, among other pollutants. Due to the high sulfur dioxide content in the flue gas 23, the composition of the catalytic material 18a–18e of the $deNO_x$ catalytic converter 2 is varied from one catalytic converter plane to another. Specifically, a vanadium pentoxide content in the catalytic material 18a–18e is lowered from 1.5 weight % in the catalytic converter plane 8 on the input side in increments of 0.3 weight % until it reaches 0.3 weight % at the plane 16 on the output side. This subject matter is represented by different thicknesses of the lines in the drawing. The catalytic material 18a–18e in this case is in the form of honeycomb catalytic converters, which are installed in element cases and are joined to make modules, with each catalytic converter plane 8, 10, 12, 14, 16 being made up of a plurality of modules. The catalytic material 18a contains not only 1.5 weight % of vanadium pentoxide $V_2O_5$ but also approximately 6 weight % of molybdenum oxide $MoO_3$ or tungsten oxide $WO_3$ and slight quantities of additives and is supplemented with titanium dioxide $TiO_2$ to make up 100 weight %.

At catalytically active centers, the nitrogen oxides are catalytically converted with ammonia to make water and nitrogen. In the process, the conversion of $SO_2$ to $SO_3$ is suppressed as long as the flue gas 23 still contains enough ammonia to moisten the catalytically active centers with ammonia. As the flow through the $deNO_x$ catalytic converter 2 progresses spatially, the content of nitrogen oxides and ammonia in the flue gas 23 rapidly drops because of the catalytic conversion of these two reactants. Overall, because of the catalytic conversion of the nitrogen oxides in the $deNO_x$ catalytic converter 2 as a result of the contact with the catalytic material 18a–18e, the nitrogen oxide burden of the flue gas 23 should drop to approximately 150 mg/Nm$^3$, because of physical conditions, such as emissions regulations. Overall, the concentration of sulfur dioxide remains unchanged. As a consequence of the catalytic conversion of the nitrogen oxides and ammonia, the catalytically active centers, particularly in the last catalytic planes 14 and 16 in terms of the flow direction, would be increasingly used to convert sulfur dioxide into sulfur trioxide, unless, as is provided according to the invention in this exemplary embodiment, the number of available catalytically active centers were reduced by the decrease in the vanadium pentoxide content. As a result, the ammonia occupies the catalytically active centers for a sufficiently long time, and therefore the still-available $V_2O_5$ centers are utilized primarily for the catalytic conversion of the nitrogen oxides and ammonia that are still contained in the flue gas 23. As a result, the $SO_2$ molecules find no, or only a few, free catalytically active centers with sufficiently high catalytic activity, and therefore the $SO_2/SO_3$ conversion, as an undesired side reaction, is largely averted.

In this exemplary embodiment, although it is of only secondary importance, an input of heat resulting from the slightly exothermic reaction of the nitrogen oxides with the ammonia contributes to the good catalytic conversion of the nitrogen oxides and ammonia. Due to the increase in temperature of the flue gas 23, the decrease in catalytic activity resulting from the aforementioned reduction in the vanadium pentoxide content is counteracted. In the dimensioning, an additional slight lowering of the vanadium pentoxide content in the flow direction of the flue gas 23 may as a result be taken into account.

Figure 2:
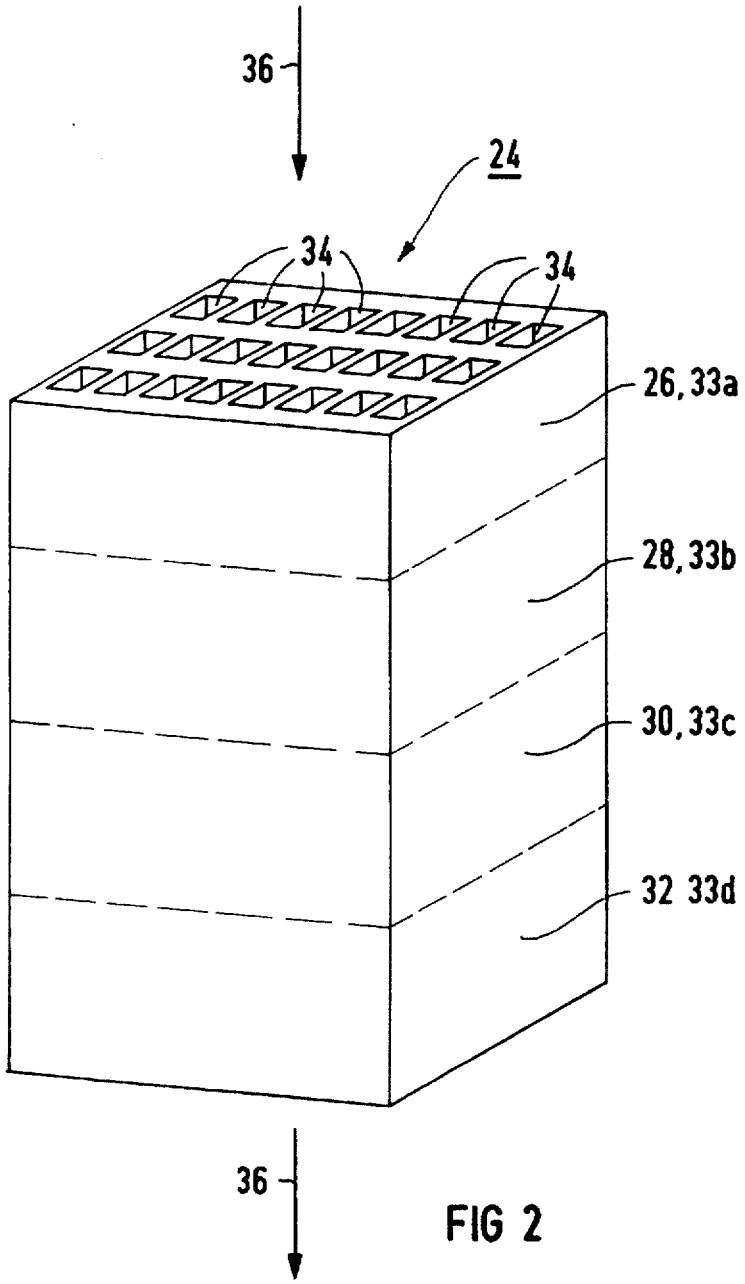
FIG. 2 is a perspective view of a catalytic converter for oxidizing hydrocarbons and carbon monoxide.

A honeycomb-like catalytic converter 24 shown in FIG. 2 is intended for the oxidation of hydrocarbons and carbon monoxide. The catalytic converter 24 includes four parts in the form of catalyst carriers 26, 28, 30, 32 each of which has a chemical composition of a catalytically active substance 33a–33d. The part 26 has a platinum content of 4 weight % of the catalytically active substance 33a–33d. The platinum content decreases continuously in the flow direction by 1 weight %, so that the part 32 contains only 1 weight % of platinum. Aluminum oxide $Al_2O_3$, which itself is applied to a ceramic substrate structure, is used as a carrier material for the platinum.

When the catalytic converter 24 is operating properly, an exhaust gas 36 being indicated by arrows and containing carbon monoxide and hydrocarbons flows through gas channels 34 of the catalytic converter 24. In the process, the exhaust gas 36 flows first into the part 26 of the catalytic converter 24, which comes first in the direction of the arrows, and because of its platinum content of approximately 4 weight % exhibits the highest catalytic activity among the chemical compositions of all of the parts 26, 28, 30, 32 being used. As a result of the contact of the carbon monoxide and of the hydrocarbons with the platinum applied to the surface, these pollutants, in the simultaneous presence of oxygen from the air, are converted into carbon dioxide and water. Since, as a consequence of the catalytic conversion of the pollutants named above, the exhaust gas 36 is heated, adequately good catalytic conversion of the carbon monoxide and hydrocarbons along the flow path is attained even at the lesser catalytic activities of part 28 and of the following parts 30 and 32 of the catalytic converter 24. Nitrogen oxides, which may possibly be contained in the exhaust gas 36 upstream of the entry of the catalytic converter 24 as seen in the flow direction of the exhaust gas, are catalytically converted to nitrogen and carbon dioxide by this catalytic converter 24 along with the carbon monoxide, which acts as a reducing agent for nitrogen oxides.

Due to the decrease in the platinum content of the parts 26, 28, 30, 32 of the catalytic converter 24 in the direction of the flow path, the catalytic activity per unit of surface area, as determined by the catalytic activity of the catalytic converter 24 and by the physical conditions, remains virtually the same along the entire flow path through the catalytic converter 24 for the exhaust gas 36. A catalytic activity of the catalytically active substance used in the catalytic converter 24 that remains the same (platinum content that stays constant) along the flow path would otherwise lead to the generation of undesired, environmentally harmful nitrogen oxides, with the increasing flue gas temperature. Therefore, the advantages associated with the use of such a catalytic converter would be offset by major disadvantages from nitrogen oxide development.

The illustrated catalytic converter 24 is composed of the four parts 26, 28, 30, 32 which are separately produced. The manufacturing process for the parts 26, 28, 30, 32 is always the same, except for a different platinum concentration in the starting material from one batch to the other.

An alternative procedure for producing a catalytic converter 24 with a decreasing content of the catalytically active substance in the flow direction of the exhaust gas 36 may include varying the composition of the catalytic converter raw material in the production step of extrusion, for example by varying it more or less continuously. This means that the content of the catalytically active substance, in this case platinum, decreases linearly along the flow path for the exhaust gas, for instance, or has a profile of rounded-off stages along the flow path.

Figure 3:
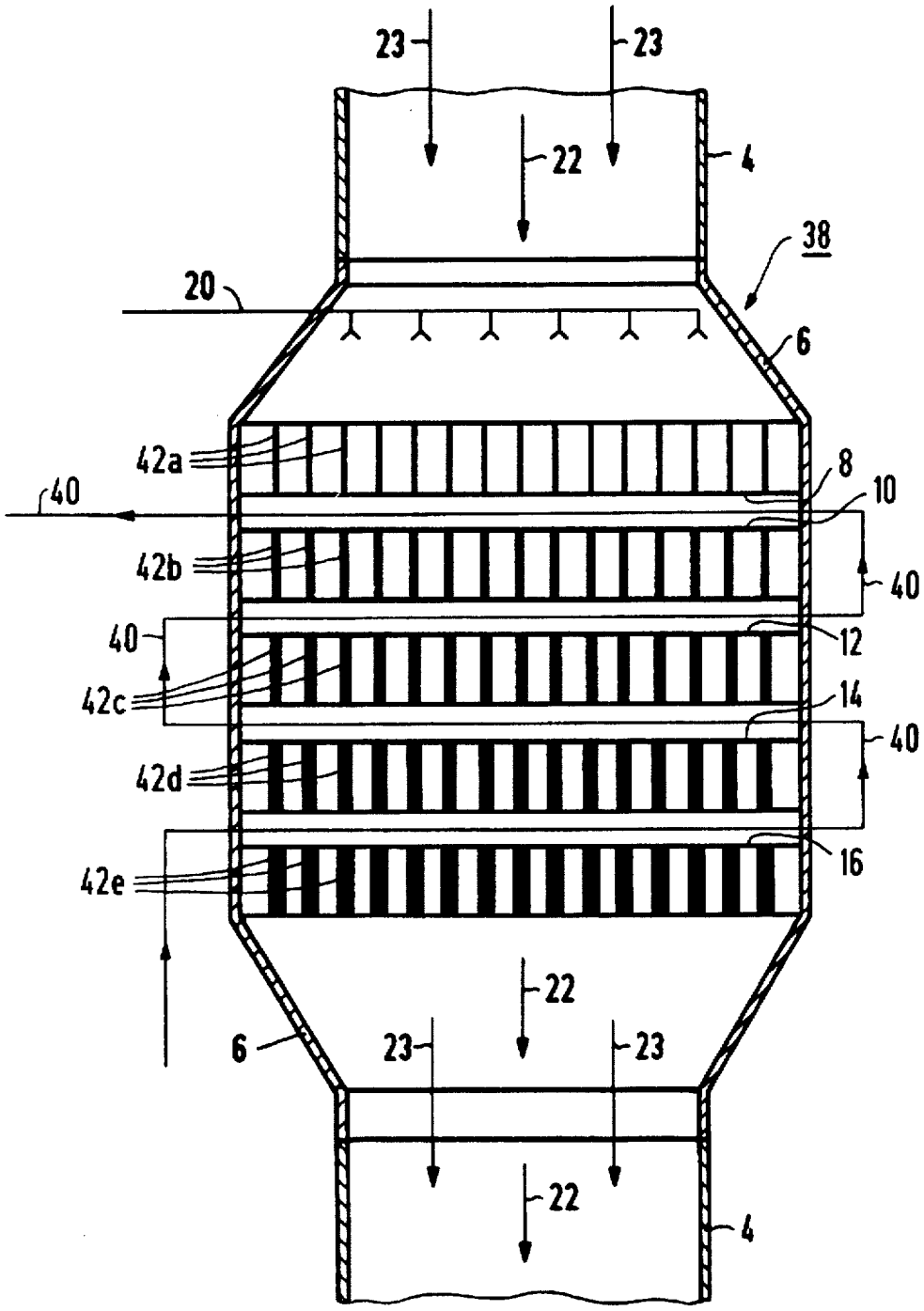
FIG. 3 is a view similar to FIG. 1 of a catalytic converter for decreasing the nitrogen oxides in flue gas, with means for effecting heat exchange.

A further exemplary embodiment, which is shown in FIG. 3, is attained if means 40 for temperature reduction are provided along the flow path of the flue gas 23 in a catalytic converter 38, in an intended exothermic reaction such as the $deNO_x$ reaction. The means 40 for temperature reduction may, for instance, be heat exchanger tubes with water running through them or air flowing through them.

By way of example, the $deNO_x$ catalytic converter 38 is then disposed in a reactor 6 which is constructed as a waste heat boiler. A catalytically active substance 42a–42e is located on plate catalytic converters disposed in planes in the form of catalyst carriers 8, 10, 12, 14, 16. The catalytically active substance 42a–42e disposed in the planes 8, 10, 12, 14, 16 includes titanium dioxide vanadium pentoxide and/or $V_xMo_yO_{32-z}$, where $x+y \leqq 12$; $x, y \geqq 1$; $z \leqq 1$, and molybdenum oxide. The content of vanadium pentoxide and/or $V_xMo_yO_{32-z}$ in the substance 42a amounts to approximately 1 weight % and rises in the flow direction of the flue gas from plane to plane, by approximately 1 weight % at a time, to approximately 5 weight % at the plane 16. This is represented by the varying thicknesses of the lines to indicate the catalytically active substance 42a–42e. At the catalytically active substance 42a–42e, the nitrogen oxides and ammonia contained in the flue gas 23 are put into contact with the substance and converted catalytically into nitrogen and water. Due to the continuous decrease in the temperature of the flue gas 23 along the catalytically active substance 42a–42e in the reactor 6, the degree of separation for nitrogen oxides drops because of the associated decrease in total activity. However, this decrease is counteracted by increasing the proportion of the catalytically active substance, in this case vanadium pentoxide and/or $V_xMo_yO_{32-z}$, since the heating of the flue gas which is only slight, resulting from the slight exothermic reaction of the nitrogen oxides with the ammonia, is not adequate to compensate for this decrease.

In a flue gas that is still hot, at approximately 300° C., at the inlet to the reactor 6, it is practical, in order to achieve adequately high separation degrees for nitrogen oxide and for adequately good suppression of the $SO_2/SO_3$ conversion, to allow the content of vanadium pentoxide and/or $V_xMo_yO_{32-z}$ to increase from approximately 1 weight % to a maximum of 5 weight % along the flow path of the flue gas 23 in the catalytic converter 38. An undesired, higher conversion rate for $SO_2$ to $SO_3$ as a consequence of the increase in the vanadium pentoxide content need not be feared, because this increase precisely compensates for the decrease in activity due to the lowering of the temperature. In this way, in this case as in the preceding exemplary embodiments, the reactants, which in this case are intentionally nitrogen oxides and ammonia and unintentionally sulfur dioxide and sulfur trioxide, will always "see" a constant catalytic activity of the catalytic converter along their flow path through the catalytic converter.

Alternatively to the exemplary embodiment shown in FIG. 3, the catalytically active substance may also be applied directly to heat-exchanging surfaces, such as in gas preheaters or air preheaters. There again, by increasing the proportion of the catalytically active component in the catalytically active substance, a catalytic activity that remains constant along the flow path is attained.

We claim:

1. A catalytic converter for accelerating at least one reaction between at least two reactants of a gas mixture, comprising a catalytically active substance carried on [said] *a* catalyst carrier, said catalytically active substance having a catalytic activity decreasing in a flow direction of [a] *the* gas mixture as a function of a reaction-induced temperature increase caused in an exothermic reaction of reactants[, and increasing as a function of a reaction-induced temperature decrease caused in an endothermic reaction of the reactants].

2. The catalytic converter according to claim 1, wherein said catalyst carrier has a macroscopic structure which is variable in the flow direction of the gas mixture.

3. The catalytic converter according to claim 1, wherein said catalyst carrier is a plurality of catalyst carriers disposed along the flow direction, and the catalytic activity decreases [or increases] from one of said catalyst carriers to another.

4. The catalytic converter according to claim 1, further comprising means for supplying an ammonia content into the gas mixture upstream of said catalyst carrier as seen in the flow direction and wherein at least one of titanium dioxide, vanadium pentoxide, and $V_xMo_yO_{32-z}$, where $x+y \leqq 12$; $x, y \geqq 1$; $z \leqq 1$, and at least one additive selected from the group consisting of tungsten trioxide and molybdenum trioxide are essentially contained in said catalytically active substance, and, in the flow direction of the gas mixture, the content of at least one of titanium dioxide, vanadium pentoxide and $V_xMo_yO_{32-z}$ decreases in accordance with a decreasing ammonia content in the gas mixture.

5. The catalytic converter according to claim 1, wherein at least one of titanium dioxide, vanadium pentoxide, and $V_xMo_yO_{32-z}$, where $x+y \leqq 12$; $x, y \geqq 1$; and $z \leqq 1$, and at least one additive selected from the group consisting of tungsten trioxide and molybdenum trioxide are essentially contained in said catalytically active substance, and, in the flow direction of the gas mixture, a concentration of at least one of titanium dioxide, vanadium pentoxide and $V_xMo_yO_{32-z}$ decreases upon use in exothermic reactions [and increases upon use in endothermic reactions].

6. The catalytic converter according to claim 5, wherein [a] *the* concentration of at least one of titanium dioxide, vanadium pentoxide and $V_xMo_yO_{32-z}$, as a function of a reaction-caused increase [or decrease] in temperature, [respectively] decreases from a maximum of 10 weight % [or increases to a maximum of 10 weight %,] relative to a total weight of said catalytically active substance.

7. The catalytic converter according to claim 1, wherein said catalytically active substance is [a] *at* least one of platinum, copper oxide and iron oxide, and a concentration of said catalytically active substance in the flow direction of the gas mixture is [respectively] adjusted to decrease [or increase] as a function of a reaction-caused temperature increase [or decrease].

8. The catalytic converter according to claim 7, wherein the concentration of said catalytically active substance decreases from a maximum of 10 weight % [or increases to a maximum of 10 weight %,] relative to a total weight of said catalytically active substance.

9. The catalytic converter according to claim 1, wherein at least one of titanium dioxide, vanadium pentoxide and $V_xMo_yO_{32-z}$, where $x+y \leqq 12$; $x, y \geqq 1$; $z \leqq 1$, at least one of tungsten trioxide and molybdenum trioxide are essentially contained in said catalytically active substance, and including means disposed along the flow path of the gas mixture for temperature reduction of the gas mixture and the content of at least one of titanium dioxide, vanadium pentoxide and $V_xMo_yO_{32-z}$ increases in the flow direction of the gas mixture to compensate for the decrease in activity caused by the temperature decrease *effected by said means for temperature reduction.*

*10. A catalytic converter for accelerating at least one reaction between at least two reactants of a gas mixture, comprising a catalytically active substance carried on a catalyst carrier, said catalytically active substance having a catalytic activity increasing in a flow direction of the gas mixture as a function of a reaction-induced temperature decrease caused in an endothermic reaction of the reactants.*

*11. The catalytic converter according to claim 10, wherein said catalyst carrier has a macroscopic structure which is variable in the flow direction of the gas mixture.*

*12. The catalytic converter according to claim 10, wherein said catalyst carrier is a plurality of catalyst carriers disposed along the flow direction, and the catalytic activity increases from one of said catalyst carriers to another.*

*13. The catalytic converter according to claim 10, further comprising means for supplying an ammonia content into the gas mixture upstream of said catalyst carrier as seen in the flow direction, and wherein at least one of titanium dioxide, vanadium pentoxide, and $V_xMo_yO_{32-z}$, where $x+y \leqq 12$; $x, y \geqq 1$; $z \leqq 1$, and at least one additive selected from the group consisting of tungsten trioxide and molybdenum trioxide are essentially contained in said catalytically active substance, and, in the flow direction of the gas mixture, the content of at least one of titanium dioxide, vanadium pentoxide and $V_xMo_yO_{32-z}$ decreases in accordance with a decreasing ammonia content in the gas mixture.*

*14. The catalytic converter according to claim 10, wherein at least one of titanium dioxide, vanadium pentoxide, and* $V_xMo_yO_{32-z}$, *where* $x+y \leqq 12$; $x, y \geqq 1$; $z \leqq 1$, *and at least one additive selected from the group consisting of tungsten trioxide and molybdenum trioxide are essentially contained in said catalytically active substance, and, in the flow direction of the gas mixture, a concentration of at least one of titanium dioxide, vanadium pentoxide and* $V_xMO_yO_{32-z}$ *increases upon use in endothermic reactions.*

*15. The catalytic converter according to claim 14, wherein the concentration of at least one of titanium dioxide, vanadium pentoxide and* $V_xMo_yO_{32-z}$ *as a function of a reaction-caused decrease in temperature, increases to a maximum of 10 weight %, relative to a total weight of said catalytically active substance.*

*16. The catalytic converter according to claim 10, wherein said catalytically active substance is at least one of platinum, copper oxide and iron oxide, and a concentration of said catalytically active substance in the flow direction of the gas mixture is adjusted to increase as a function of a reaction-caused temperature decrease.*

*17. The catalytic converter according to claim 16, wherein the concentration of said catalytically active substance increases to a maximum of 10 weight % relative to a total weight of said catalytically active substance.*

* * * * *